Feb. 19, 1935.　　　R. L. SEABURY　　　1,991,706
PLASTIC MOLDING APPARATUS
Filed Dec. 8, 1930　　5 Sheets-Sheet 3
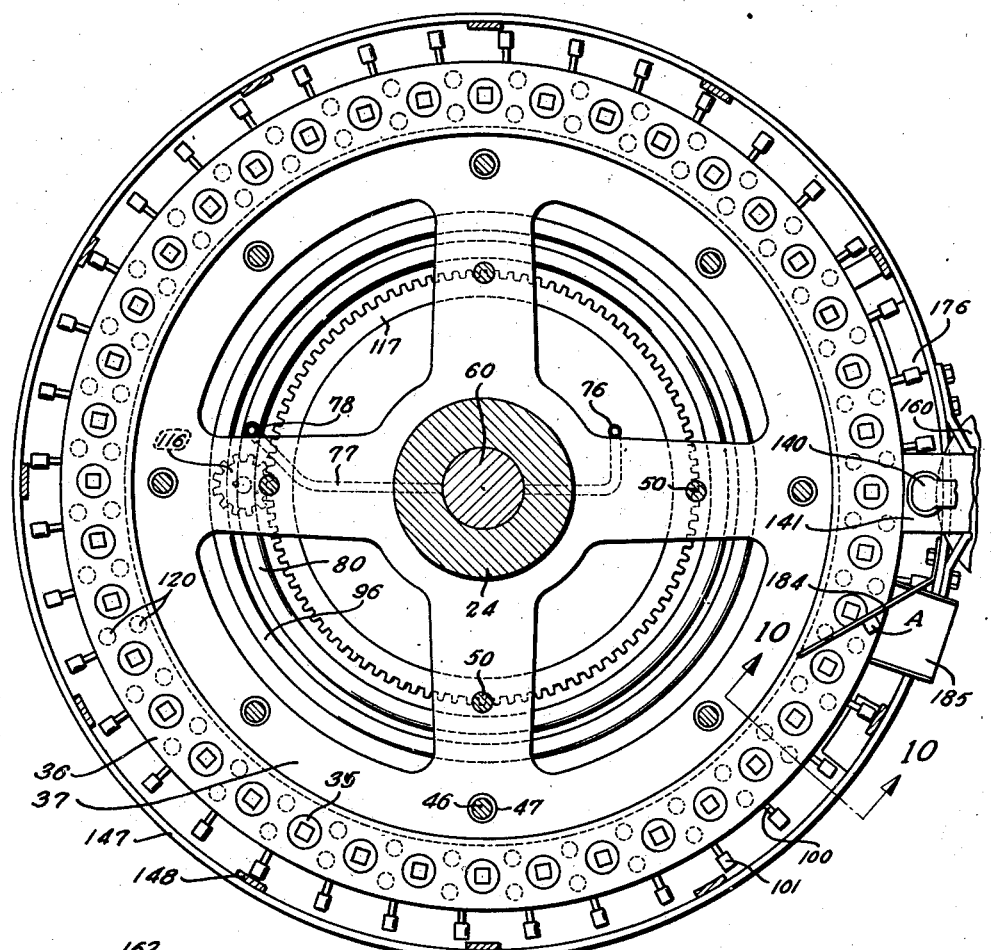
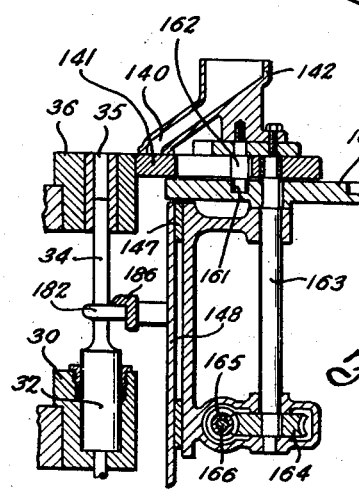

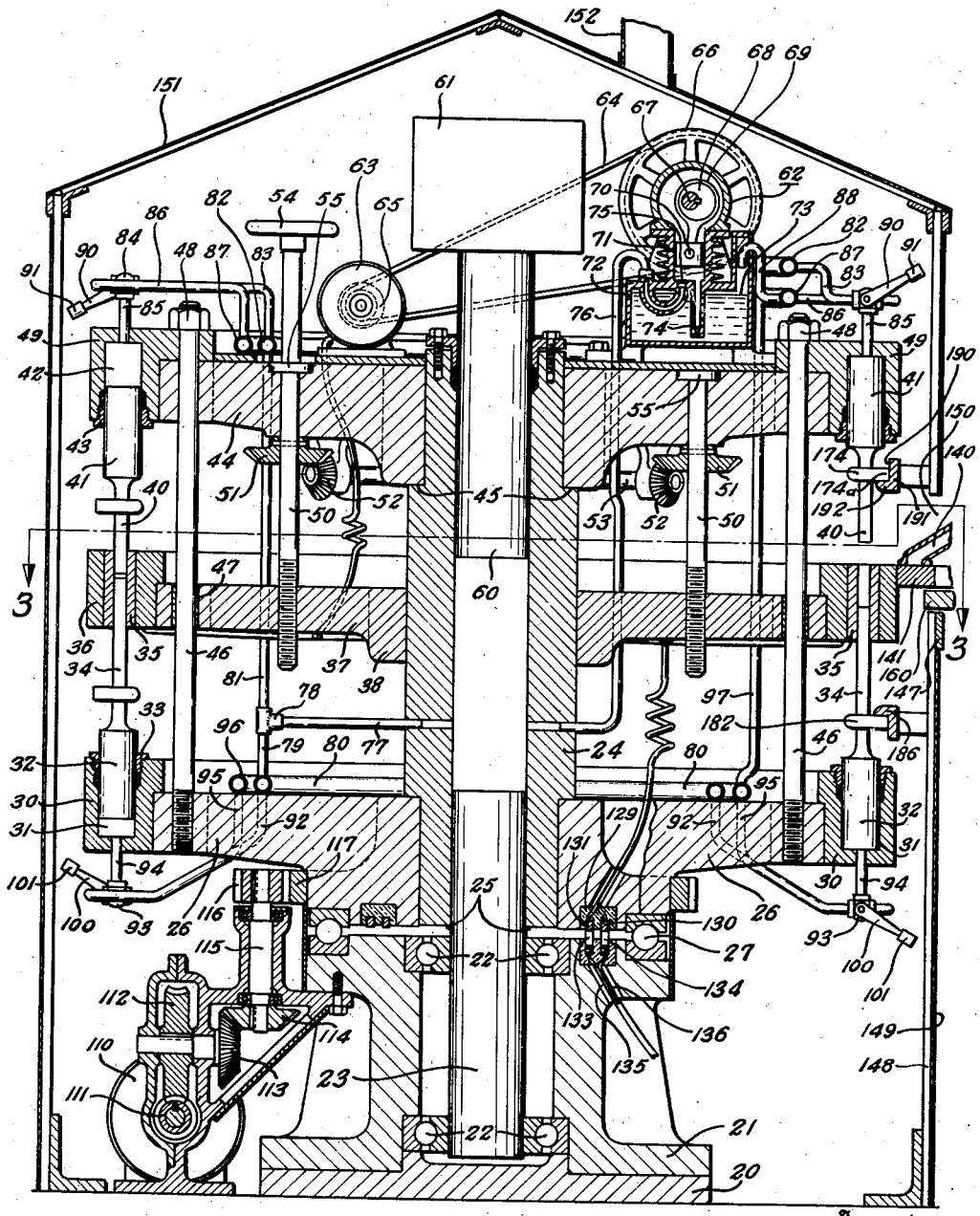

Feb. 19, 1935.  R. L. SEABURY  1,991,706
PLASTIC MOLDING APPARATUS
Filed Dec. 8, 1930   5 Sheets-Sheet 5
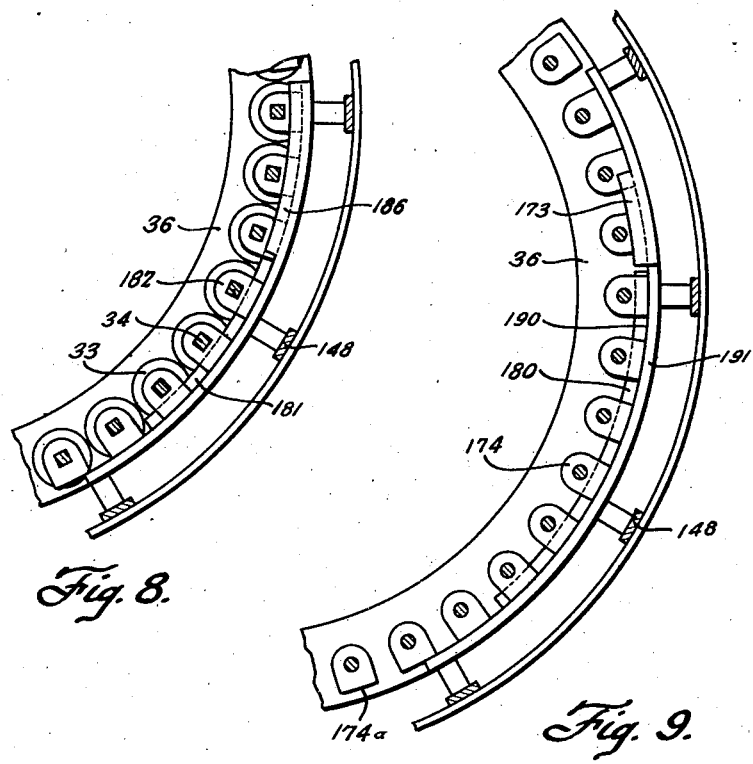
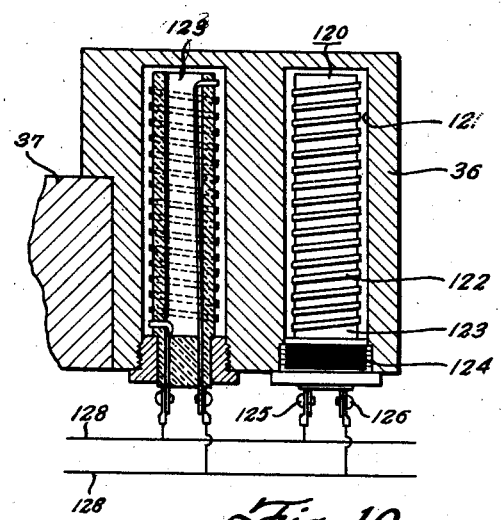
Inventor
Ralph L. Seabury
By Spencer Hardman & Fehr
his Attorneys Patented Feb. 19, 1935

1,991,706

UNITED STATES PATENT OFFICE 1,991,706

PLASTIC MOLDING APPARATUS

Ralph L. Seabury, Anderson, Ind., assignor, by mesne assignments, to General Motors Corporation, Detroit, Mich., a corporation of Delaware Application December 8, 1930, Serial No. 500,832

7 Claims. (Cl. 18—20)

This invention relates to the manufacture of parts from molding compounds which harden under the application of heat and pressure, one example of such a molding compound being bakelite, a well known phenolic condensation product which hardens under the application of heat and pressure.

It is one of the objects of the present invention to provide apparatus for automatically manufacturing parts from molding material of the kind referred to. This object of the invention is carried out in the disclosed embodiment by a machine which comprises a turn table conveyor having a number of cavities or dies in which the molding compound is introduced, a forming punch cooperating with the die, means for applying pressure to the forming punch and continuing the application of pressure while the die remains heated for a certain period, and means for ejecting the molded part from the die after the curing operation has been completed.

Further objects and advantages of the present invention will be apparent from the following description, reference being had to the accompanying drawings wherein a preferred embodiment of one form of the present invention is clearly shown.

In the drawings:

Fig. 2 is a vertical section taken principally on the line 2—2 of Fig. 1.

Fig. 3 is a sectional view on the line 3—3 of Fig. 2.

Fig. 4 is a fragmentary plan view of the die filling or loading apparatus.

Fig. 5 is a sectional view on the line 5—5 of Fig. 4.

Figure 6:
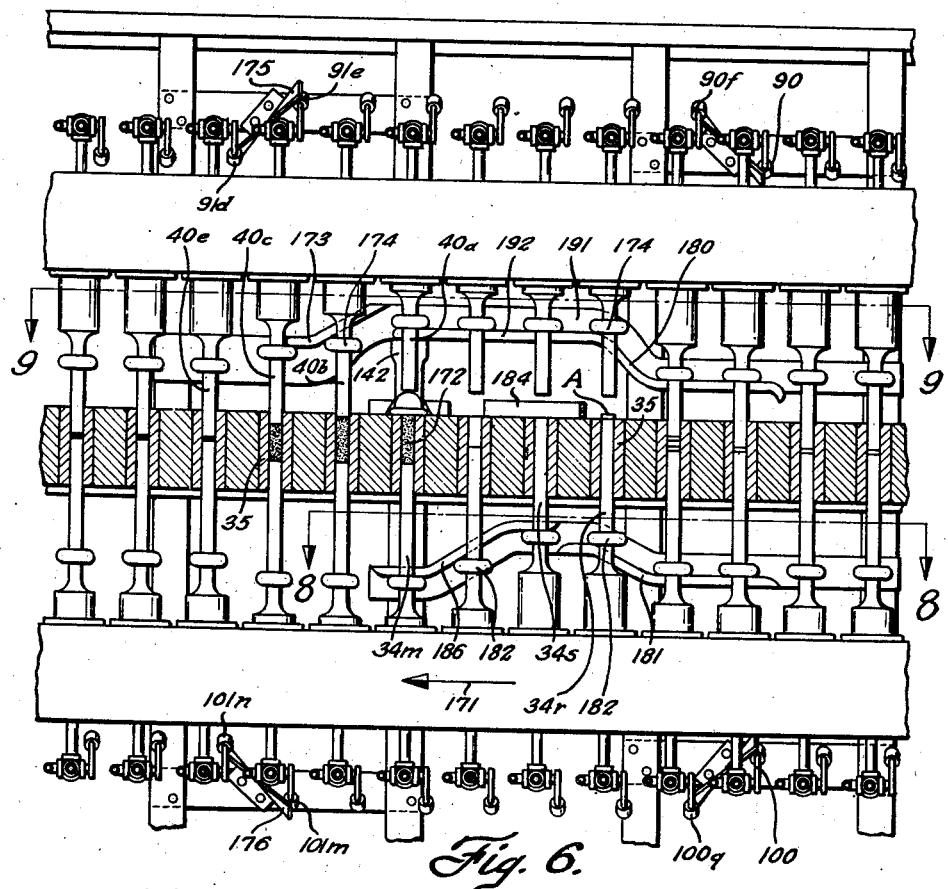
Fig. 6 is a fragmentary sectional view on line 6—6 of Fig. 1.

Figs. 8 and 9 are fragmentary sectional views taken respectively on lines 8—8 and 9—9 of Fig. 6.

Fig. 10 is a fragmentary sectional view on the line 10—10 of Fig. 3.

Figure 1:
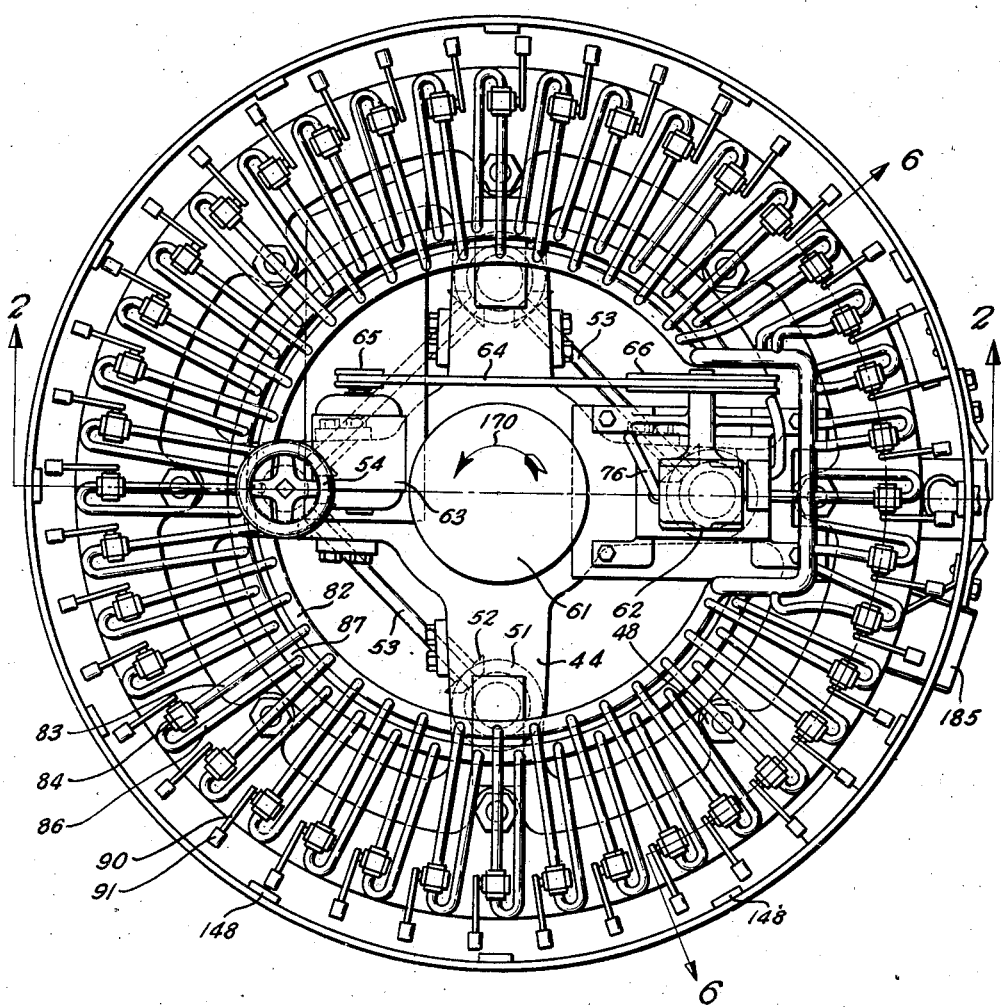
Fig. 1 is a plan view of an embodiment of the present invention, the top cover thereof being removed.

Referring principally to Figs. 1 and 2, the machine comprises a base 20 supporting a pedestal 21, providing ball bearings 22 for a shaft 23 which forms the bottom wall of a cylinder 24 to which the shaft 23 is attached by welding as at 25. The cylinder is centrally attached to a frame 26 supported by a ball thrust bearing 27 above the pedestal 21. Frame 26 carries an annular cylinder block 30 carrying a plurality of cylinders 31, each of which receives a piston 32 surrounded by packing gland 33. Each piston 32 carries a rod 34 extending into a die block 35 mounted in an annular die block support 36 which of course carries as many die blocks as there are cylinders 31 and supports these die blocks in vertical alignment respectively with the cylinders 31. The die block support 36 is carried by frame 37 having a hub 38 which slidably fits the exterior of the cylinder 24.

Each die block 35 receives a punch 40 extending downwardly from a piston 41 reciprocating in a cylinder 42 and surrounded by a packing gland 43. The cylinder 42 is provided by a cylinder block or ring 49 which of course provides as many cylinders as there are die blocks 35 and cylinders 31 and locates the cylinders 42 in alignment with the cylinders 31 and die blocks 35. The cylinder ring 49 is supported on a frame 44 carried by the cylinder 24 and resting on a ledge 45 provided thereby. The cylinder rings 30 and 49 are tied together by studs 46 threaded into the frame 26 extending through holes 47 in the frame 37 extending through holes through the parts 44 and 43 and receiving nuts 48. These rods 46 take up the pressure exerted upon the closed end walls of these cylinders 31 and 42.

The dies 35 may be adjusted relative to the rods 34 and punches 40 by raising or lowering the frame 38. This is accomplished by turning simultaneously a plurality of screws 50 which are geared together by cooperating bevel gears 51 and 52, the gears 52 being connected by cross shafts 53. The gears 51 are pinned to the screws 50. One of these screws is provided with an operating handle 54. The screws 50 are prevented from moving vertically endwise due to the fact that they are each provided with a collar 55 which resists downward movement of the screw 50, upward movement being resisted by the gear 51.

The pistons 32 and 41 are forced outwardly with respect to their cylinders by oil pressure. The cylinder 24 cooperates with a piston 60 supporting a weight 61 to provide an accumulator into which oil is forced by an oil pump 62 operated by an electric motor 63 through a belt 64 and suitable pulleys 65 and 66. The pulley 66 drives a shaft 67 which operates an eccentric 68 cooperating with an eccentric strap 69 pivotally connected with a piston 70 which is vertically reciprocatable in a cylinder 71 supported on a frame which provides the cover of an oil reservoir 72, the level of the oil being indicated at 73. The inlet valve of the pump is indicated by numeral 74 and the outlet valve by numeral 75. The high pressure oil line 76 leads from the outlet of the pump to the accumulator cylinder 24. A pipe 77 connects the cylinder 24 with a T 78 connected with a downwardly extending pipe 79 connected with a ring manifold 80. The T 78 is connected with an upwardly extending pipe 81 connected with a ring manifold 82. Referring to Fig. 1, the ring manifold 82 is connected by a branch pipe 83 with a two-way valve 84 which will connect a cylinder pipe 85 with either the branch pipe 83 or with a branch pipe 86 connected with a low pressure oil manifold 87 which is connected by pipe 88 with the low pressure oil chamber in the tank 72. The valves 84 are operated by handles 90 carrying rollers 91 which cooperate with valve operating cams to be described. When the handle 90 is up as shown on the right hand side of Fig. 2, the cylinder associated therewith is connected with the low pressure side of the oil system that is the cylinder is in fact vented through its connection with the chamber 72 which is always at atmospheric pressure. When the valve handle 90 is down as shown on the left side of Fig. 2, the cylinder associated therewith is connected only with the high pressure oil manifold 82.

Similarly the high pressure manifold 80 resting upon the frame 26 is connected with the various cylinders 31 through branch pipes 92 each connected with a two-way valve 93 which will connect a cylinder pipe 94 either with the high pressure oil branch pipe 92 or with the low pressure oil branch pipe 95 connected with a manifold 96 which is connected by pipe 97 with the low pressure oil reservoir 72. The valve 93 is controlled by handle 100 carrying a roller 101 which cooperates with valve controlling cams to be described. When the handle 100 is down, as shown at the right hand side of Fig. 2, the cylinder 31 associated therewith is connected only with the low pressure side of the oil line, or in fact is vented through the connection with the vented oil chamber 72. When the valve handle 100 is up, as shown on the left hand side of Fig. 2, the cylinder 31 associated therewith is connected only with the high pressure oil manifold 80.

The parts rotatable with the shaft 23 are caused to rotate by an electric motor 110 driving a worm 111 meshing with a worm gear 112 to drive the bevel gear 113 meshing with a bevel gear 114 carried by shaft 115, carrying a small spur gear 116 which drives a large ring gear 117 attached to the frame 26. It will be noted that all pressure lines and controls therefor are self-contained within or upon parts rotatable with the shaft. The only power supply which is not self contained within the rotating part of the apparatus is the electrical power supply for the electrical heating units represented in Fig. 3 by the small dotted line circles 120. Referring to Fig. 10, the die frame 36 is provided with cavities 121 each receiving a heating unit 120 which comprises an electrical heating element such as a nichrome wire 122 wound upon a porcelain tube 123 attached to a metal plug 124 but insulated therefrom. The terminals of the wire 122 are indicated at 125 and 126 in Fig. 10 and are connected with wires 127 and 128 respectively which lead to conducting rings 129 and 130 molded into a non-conducting ring 131 supported by the under-face of the frame 26. These rings 129 and 130 are engaged respectively by brushes 133 and 134 connected with line wires 135 and 136 respectively by which the heating elements are connected with a suitable source of current.

While the upper punch 40 is retracted from the die 35 and the lower punch or ejector rod 34 is in lowermost position as shown on the right hand side of Fig. 2, the die is ready to be filled with molding compound such as bakelite molding powder which issues from a spout or nozzle 140 normally resting on a stationary table 141 which closes the lower end of the spout. The spout is associated with a reciprocating frame 142 guided for horizontal movement radially with respect to the axis of the shaft 23 by rails 143 and 144 attached by brackets 145 and 146 respectively to a band 147 supported by certain upright members 148 which form a frame for carrying a sheet metal jacket 149 which encloses the entire machine with the exception of the opening 150 through which the filler spout 140 and table 141 may extend. The housing for the machine includes a cover 151 of conical shape having a vent pipe 152 which may be connected with a suction pump for carrying off dust as well as heat. The frame 142 is reciprocated by cam 160 cooperating with a roller 161 carried by roller stud 162 attached to the frame 42. The cam 160 is rotated by a shaft 163 carrying a worm gear 164 driven by worm 165, carried by shaft 166 driven by any suitable means, not shown. Referring to Fig. 4 it will be seen that the cam race 160a is so shaped that the frame 142 will be shaken while the filler spout 140 is in alignment with the cavity in the die 35. The frame 142 is associated with an outlet spout of a large container for molding powder.

Figure 7:
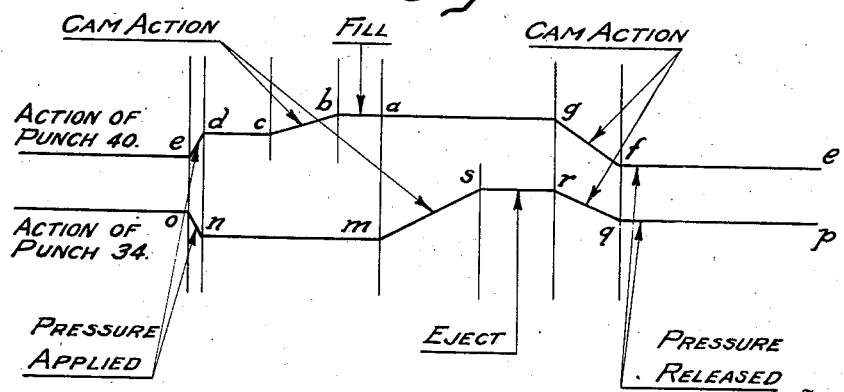
Fig. 7 is a diagram illustrating the operation of certain cams which appear in Fig. 6.

The mode of operation of the machine will be described with reference to Figs. 6 and 7. In Fig. 7 the line e—f—g—a—b—c—d—e represents the movement of the upper punch 40. The line p—q—r—s—m—n—o—p represents the corresponding action of the lower punch. The direction of rotation of the turntable is counterclockwise as indicated by the arrow 170 in Fig. 1. This direction is indicated by arrow 171 in Fig. 6. The position of the die and punch members when filling of the die begins, will be referred to as the start or home position and is represented in Fig. 7 by the points a and m. It will be noted that while the punch 40 is up between positions a and b, the die 35 is filled with molding compound indicated at 172. Between b and c the punch 40 starts to move into the die 35 by mechanical means comprising a cam 173 cooperating with a follower 174 provided by the punch 40. When the punch has arrived at the position c designated 40c in Fig. 6, its associated valve handle roller 91 is brought into engagement with a cam 175 which causes the valve 84 associated therewith to be turned between positions c and d into such position that the cylinder will be connected with the high pressure oil in order to force the ram 40 into the position 40e in Fig. 6. Concurrently with the admission of oil pressure to the cylinder 42, oil pressure is admitted to the cylinder 31 due to the cooperation of a cam 176 with the valve arm follower roller 101 moving it from the position 101m with the position 101n shown in Fig. 6. When this occurs the lower ram or punch 34 will be urged upwardly. During the major part of the revolution of the turntable conveyor the material remains under relatively high pressure while heat is applied to cure the material to render the briquetted molding compound solid and impervious. The pressure is applied until the table has moved to positions corresponding to figures $f$ and $g$ in Fig. 7. Just before arriving into these positions the valve handles 90 and 100 are moved respectively from down and up positions into the up and down positions respectively designated respectively $90f$ and $100g$ in Fig. 6, causing the cylinders associated therewith to be connected with the oil line at atmospheric pressure. Between points $f$ and $g$ the upper ram 40 is lifted by a cam 180 which engages the follower 174. The form piece A is ejected from the mold or die 35 by the upward movement of the lower ram 34 which is caused to be moved upwardly by cam 181 which engages the cam follower 182 provided by the ram 34. While the ram 34 is holding the piece A at least flush with the upper surface of the mold 35, a stationary wiper arm 184 is engaged by the piece A and consequently the piece A is wiped off the turntable and descends through a chute 185. The upper position of the punch 34 is designated by reference numeral $34r$ in Fig. 6. The punch 34 is caused to be moved downwardly from the position $34s$ to the position $34m$ in Fig. 6 corresponding to points $s$ and $m$ respectively in Fig. 7 by means of a second cam 186 which engages the cam follower 182, consequently at home position the upper ram 40 is in the position $40a$ and is sufficiently above the die 35 to permit the filler nozzle 140 to move over the die cavity and to be shaken by the cam 160 to fill the mold. At the same time the lower ram 34 is located in the lowermost position $34m$ so that the full amount of molding material will descend from the filler nozzle 140.

The various cams which control the vertical movements of the upper and lower rams by direct mechanical means, and the various cams which control the two-way valves are all supported upon frame work carried by the upright post 148 of the housing for the machine as more clearly shown in Figs. 6, 8 and 9.

If the cross sectional contour of the mold cavity is other than round, it is apparent that means are required to prevent the upper rams 40 from turning while they are out of their respective mold cavities. Accordingly each cam follower 174 is provided with a flat $174a$ which remains in engagement with the upright cylindrical surface 190 of the plate 191 which carries the cams 180 and 173. This plate 191 carries also a horizontal ledge 192 which positively prevents the descent of the rams 40 during the operations of ejecting the work from the molds, scraping off the work from the turntable and filling the empty mold cavity.

It is apparent from the foregoing description of the construction and mode of operation of the present invention that a briquetting and briquette curing machine of this type is susceptible of a great variety of uses. One of the uses is that of making brushes for dynamo electric machines, said brushes being composed of graphite with a binder of bakelite. In this machine the intimately mixed graphite and bakelite powder is automatically placed in the mold cavity, is automatically briquetted to the desired size and is automatically cured before it is automatically ejected from the machine. Nothing further is required to be done in the manufacture of a brush after it leaves this machine except to grind its faces to exact dimensions, and with the exception that in case a brush of relatively low resistance is required it may be necessary to sinter the cured brushes in order to completely coke the bakelite.

While the form of embodiment of the present invention as herein disclosed, constitutes a preferred form, it is to be understood that other forms might be adopted, all coming within the scope of the claims which follow.

What is claimed is as follows:

1. Plastic molding apparatus comprising, in combination, a turntable conveyor including three superposed annular frames, the top and bottom frames each providing a plurality of fluid pressure cylinders and the middle frame providing molds each in alignment with two cylinders one above and the other below, pistons in the cylinders carrying briquetting punches cooperating with the molds, each mold receiving two aligned punches one entering from above and the other from below, a self contained fluid pressure system moving with the conveyor and comprising low and high pressure fluid chambers and a pump for forcing fluid from the low pressure chamber to the high pressure chamber, individual two-way valves for controlling connections between each of the cylinders and the chambers, and means responsive to movement of the conveyor for operating the valves.

2. Plastic molding apparatus comprising, in combination, a turntable conveyor having a hollow hub and arms extending therefrom and supporting upper, middle and lower annular frames, the upper and lower frames each providing a plurality of fluid pressure cylinders and the middle frame providing molds each in alignment with two cylinders one above and the other below, pistons in the cylinders carrying briquetting punches cooperating with the molds, each mold receiving two aligned punches one entering from above and the other from below, a self contained fluid pressure system supported by the conveyor and comprising an accumulator or high pressure reservoir provided by the hollow hub of the conveyor, a pump and a low pressure reservoir, individual two-way valves for controlling connections between each of the cylinders and the chambers, and means responsive to movement of the conveyor for operating the valves.

3. Apparatus for briquetting finely divided material comprising: a traveling conveyor having a series of briquetting devices each comprising a mold open at opposed ends and a pair of opposed reciprocating punches cooperating with said mold to briquette the material therein, a cam means 180 for successively retracting one punch of each pair from said molds to permit filling thereof with loose material, a second cam means 173 for causing said punches to successively reenter said molds and compress said material to a relatively low compression, and hydraulic means actuated after said low pressure compression for then causing said pairs of punches to advance and compress said material to a relatively high compression.

4. Apparatus for briquetting finely divided material, comprising: a traveling conveyor having a series of briquetting devices each comprising a mold open at opposed ends and a pair of opposed reciprocating punches cooperating with said mold to briquette material therein, a cam means 180 for successively retracting one punch of each pair from said molds to permit filling thereof with loose material, a second cam means 173 for causing said punches to successively reenter said molds and compress said material to a relatively low compression, hydraulic means actuated after said low pressure compression for then causing said pairs of punches to advance and compress said material to a relatively high compression, and cam means 181 for successively advancing one of each pair of punches to eject the molded article after the other punch has been retracted from the mold.

5. Apparatus for briquetting finely divided material, comprising: a traveling conveyor having a series of briquetting devices each comprising a mold open at opposed ends and a pair of opposed reciprocating punches cooperating with said mold to briquette the material therein, means for filling said mold with loose material, mechanical means for actuating said punches to partially compress said loose material in said mold, and hydraulic means automatically actuated after said partial compression to thereafter advance said punches and compress said material to a relatively high compression.

6. Apparatus for briquetting finely divided material, comprising: a traveling conveyor having a series of briquetting devices each comprising a mold open at opposed ends and a pair of opposed reciprocating punches cooperating with said mold to briquette the material therein, means for filling said mold with loose material, mechanical means for actuating said punches to partially compress said loose material in said mold, hydraulic means automatically actuated after said partial compression to thereafter advance said punches and compress said material to a relatively high compression, and mechanical means 181 for causing one of each pair of punches to advance after the molding operation is completed and eject the molded article from the mold.

7. Apparatus for briquetting loose powdered material, comprising: a traveling conveyor having a series of briquetting devices each comprising a mold open at both ends and a pair of opposed reciprocating punches cooperating therewith, a cam for withdrawing one of each pair of punches to permit filling of the mold with loose material and then to cause said punch to reenter its mold and partially compress said material, hydraulic means for then advancing each of the punches of a pair to highly compress the material therebetween and maintain such compression over a desired distance of travel of said conveyor, means for releasing said hydraulic pressure after said desired travel, and cam means 181 for advancing the other of each pair of punches while said one punch is withdrawn to eject the molded article.

RALPH L. SEABURY.